(12) United States Patent
Sickart et al.

(10) Patent No.: US 7,694,604 B2
(45) Date of Patent: Apr. 13, 2010

(54) SHIFTING MECHANISM FOR AN AUTOMATED OR AUTOMATIC TRANSMISSION

(75) Inventors: Michael Sickart, Heimsheim (DE); Michael Funk, Stuttgart (DE); Peter Baur, Moensheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 662 days.

(21) Appl. No.: 11/407,064

(22) Filed: Apr. 20, 2006

(65) Prior Publication Data

US 2006/0248976 A1   Nov. 9, 2006

(30) Foreign Application Priority Data

May 4, 2005   (DE)   ........................ 10 2005 020 721

(51) Int. Cl.
   *B60K 20/00*   (2006.01)
   *G05G 9/00*    (2006.01)
   *B60K 17/04*   (2006.01)
   *F16H 59/04*   (2006.01)

(52) U.S. Cl. ................ 74/473.18; 74/473.12; 74/473.33

(58) Field of Classification Search ............ 74/471 XY, 74/473.12, 473.18, 473.1, 473.19, 473.3, 74/473.33
   See application file for complete search history.

(56) References Cited

U.S. PATENT DOCUMENTS

| | | | |
|---|---|---|---|
| 6,223,112 B1 * | 4/2001 | Nishino ........................ 701/55 |
| 6,443,025 B2 * | 9/2002 | Ohashi et al. ............ 74/473.18 |
| 6,895,833 B2 * | 5/2005 | Cho ........................ 74/473.18 |
| 2002/0196139 A1 * | 12/2002 | Nagasaka .................... 340/456 |
| 2003/0172762 A1 * | 9/2003 | Ehrmaier et al. ......... 74/473.33 |

FOREIGN PATENT DOCUMENTS

| | | |
|---|---|---|
| DE | 37 17 675 C2 | 12/1988 |
| DE | 197 37 296 A1 | 3/1999 |
| DE | 198 49 076 A1 | 4/2000 |
| DE | 100 59 277 A1 | 6/2001 |
| DE | 20 2004 004 151 U1 | 7/2004 |

OTHER PUBLICATIONS

Translation of DE2020044151.*
European Search Report dated Dec. 6, 2007 w/English translation of pertinent portion (ten (10) pages).

* cited by examiner

*Primary Examiner*—Thomas R Hannon
*Assistant Examiner*—James Pilkington
(74) *Attorney, Agent, or Firm*—RatnerPrestia

(57) ABSTRACT

A shifting mechanism for an automated or automatic transmission includes a selection lever that can be shifted in a first shift gate between automatic selection stages. The selection lever can be shifted, via a first lateral gate, to a second shift gate in order to allow the manual selection of individual transmission gears, and via a second lateral gate, with which various modes, for example an automatic or a manual mode, can be activated using the selection lever. In addition to three stable positions for the selection stages, the selection lever has a fourth stable position, from which all driving modes can be set.

9 Claims, 1 Drawing Sheet

SHIFTING MECHANISM FOR AN AUTOMATED OR AUTOMATIC TRANSMISSION

This application claims the priority of German application 10 2005 020 721.9, filed May 4, 2005, the disclosure of which is expressly incorporated by reference herein.

This invention relates to a shifting mechanism for an automated or automatic transmission including a selection lever, a first shift gate in which the selection lever can be shifted between automatic selection stages, a second shift gate in which the lever can select individual transmission gears manually, a first lateral gate via which the selection lever is movable to the second shift gate, and a second lateral gate with which various modes can be activated using the selection lever.

German document DE 37 17 675 C2 discloses a shifting mechanism for an automatic transmission, in which a selection lever can be shifted via a lateral gate into two shift gates. In a first shift gate the selector positions P, R, N, D, 3, 2, 1 can be preselected. In the second shift gate individual gears can be manually engaged.

Another shifting design for an automated or automatic transmission is known from German document DE 20 2004 004 151 U1. The selection lever for the two shift gates of this shifting mechanism has only one stable position, from which all driving modes can be set. Once the transmission gear has been selected, the selection lever is returned to the single stable position, in the manner of a joystick.

Based upon the two-gate shifting plan for a powershift transmission, known from German document DE 37 17 675 C2, one object of the invention is to improve upon the functionality of a shifting mechanism of this type, without significantly altering the essential shifting processes in motor vehicles that are already familiar to drivers from daily use of an automated or automatic transmission.

The object mentioned is attained by way of a shifting mechanism including a selection lever having, in addition to three stable positions for the automatic selection stages, a fourth stable position from which all driving conditions can be set.

According to the invention, the three stable positions for the selection stages P, R and N are retained, while the automatic selection stage D and the manual mode M can be selected via a fourth stable position of the selection lever.

Further advantageous embodiments and further improvements on the shifting mechanism are claimed.

The fourth stable position for the selection level is located at the center of the second shift gate, from which the selection lever can be shifted via the first lateral shift gate to the positions for the selection stages P, R, N and D, or via the second lateral gate to the manual mode M. After selection of the manual mode M or the selection stage D, the selection lever is returned to the fourth stable position, in the manner of a joystick, by a spring mechanism. In this manner it is possible, for example when the selection stage D is engaged, to change directly from the automatic mode to the manual shifting mode.

In the second shift gate, in the manual mode, single or multiple shifts are possible.

In order to give the driver a clear visual indication of the driving gear that has been engaged, it is proposed to display the four stable positions, for example on the instrument panel, by light-emitting diodes, and to indicate the manual mode M and the selection stage D as digital displays.

One embodiment of the invention is illustrated in the drawings and will be described in greater detail below.

DETAILED DESCRIPTION OF THE INVENTION

Figure 1:
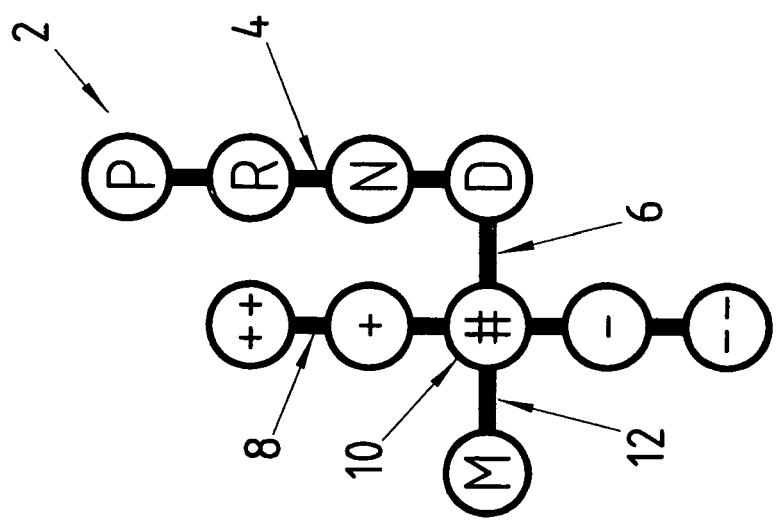
FIG. 1 is a shifting plan for a powershift transmission.

The shifting mechanism 2 shown in FIG. 1 comprises a selection lever that is not shown here, which can be shifted in a first shift gate 4 between the automatic selection stages P, R, N and D. Via a first lateral gate 6, the selection lever can be moved to a second shift gate 8. In this second shift gate 8, the transmission gears can be manually selected by means of single or multiple shifts up or down. In this, the selection lever is always returned by means of a spring mechanism to a fourth stable position 10 in the manner of a joystick. The selection lever can be designed in the manner of a fingertip switch, which the driver presses to engage the desired driving mode and which, when released, automatically returns to the stable position 10. When the selection lever is tapped into the second shift gate 8, for example in the plus direction shown in FIG. 1, a gear upshift by one or more gears takes place. Via a second lateral gate 12 the system can be switched to the manual mode M. With this, the selection lever can be moved from the stable fourth position 10 either via the first lateral gate 6 directly to the selection stage D or via the second lateral gate 12 to the manual mode M. Both the selection stage D and the manual mode M are designed as unstable positions, so that after selection, the selection lever again returns to its fourth stable position 10. Because the selection stage D and the manual mode M in the two lateral gates 6, 12 form limit stops, a clear and problem-free selection of these two modes is possible for the driver. Even if the vehicle is in the automatic selection stage D, the fingertip switch positions (+/−, ++/−−) that lie in the second shift gate 8 can be directly selected via the central stable position 10 for the selection lever.

Figure 2:
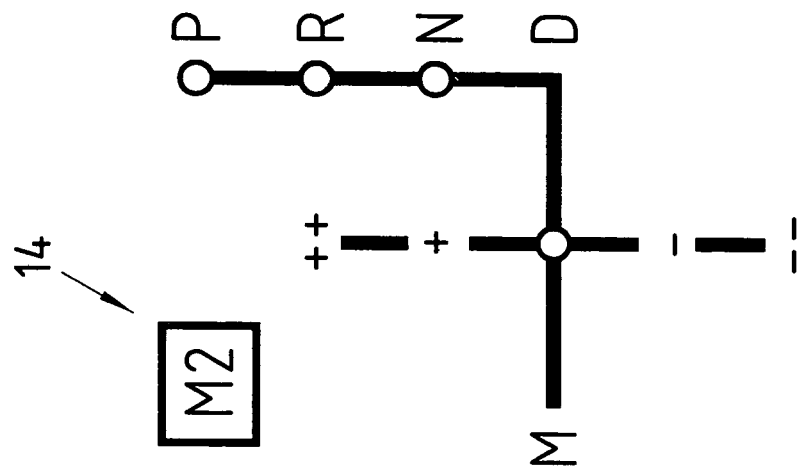
FIG. 2 is a display device for the shifting plan shown in FIG. 1.

In order to give the driver a clear visual indication of the driving gear that has been engaged, the display concept shown in FIG. 2 is used. In this, the four stable positions P, R, N and 10 for the selection lever are indicated via light-emitting diodes, while the manual mode M (+/−, ++/−−) and the selection stage D, as unstable positions for the selection lever, are indicated to the driver via a digital display 14. The manual mode M2 shown in FIG. 2 further indicates that the second gear of the powershift transmission has been engaged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A shifting mechanism for an automated or automatic transmission, comprising:

a selection lever, a first shift gate in which the selection lever can be shifted between automatic selection stages, a second shift gate in which the selection lever can be shifted in order to select individual transmission gears manually, a first lateral gate via which the selection lever is movable to the second shift gate, and a second lateral gate with which either an automatic mode or a manual mode can be activated using the selection lever, wherein the selection lever has, in addition to three stable positions for the automatic selection stages, a fourth stable position from which all driving conditions can be set, wherein only unstable positions are disposed around the fourth stable position, wherein a manual position 'M' corresponding to the manual mode and an automatic drive position 'D' corresponding to the automatic mode are disposed adjacent and on opposing sides of the fourth stable position, and both the manual position 'M' and the automatic drive position 'D' are unstable positions such that following a selection of either the manual position 'M' or the automatic drive position 'D', the selection lever automatically returns to the fourth stable position.

2. A shifting mechanism according to claim 1, wherein the fourth stable position is located at the center of the second shift gate, from which the selection lever can be shifted via the first lateral gate to positions for the automatic selection stages or via the second lateral gate to the manual mode.

3. A shifting mechanism according to claim 2, wherein single or multiple shifts are possible in the second shift gate.

4. A shifting mechanism according to claim 3, wherein, as a visual indication of the driving gear that has been engaged, light-emitting diodes are used for the four stable positions, and a digital display is used for the manual mode and the one of the selection stages.

5. A shifting mechanism according to claim 2, wherein, as a visual indication of the driving gear that has been engaged, light-emitting diodes are used for the four stable positions, and a digital display is used for the manual mode and the automatic selection stages.

6. A shifting mechanism according to claim 1, wherein single or multiple shifts are possible in the second shift gate.

7. A shifting mechanism according to claim 6, wherein, as a visual indication of the driving gear that has been engaged, light-emitting diodes are used for the four stable positions, and a digital display is used for the manual mode and the automatic selection stages.

8. A shifting mechanism according to claim 1, wherein, as a visual indication of the driving gear that has been engaged, light-emitting diodes are used for the four stable positions, and a digital display is used for the manual mode and the automatic selection stages.

9. A shifting mechanism according to claim 1 wherein only four unstable positions are disposed around the fourth stable position.

* * * * *